United States Patent [19]

Alcone et al.

[11] Patent Number: 5,301,130
[45] Date of Patent: Apr. 5, 1994

[54] ABSOULTE VELOCITY SENSOR

[75] Inventors: Jerry M. Alcone; James W. Jeter, both of Albuquerque, N. Mex.

[73] Assignee: Hughes Aircraft Company, Los Angeles, Calif.

[21] Appl. No.: 964,732

[22] Filed: Oct. 22, 1992

[51] Int. Cl.$^5$ .............................................. G01P 9/00
[52] U.S. Cl. .............................. 364/565; 364/426.02; 73/488; 324/160; 324/178
[58] Field of Search ............... 364/426.01, 426.02, 364/426.03, 565; 73/488, 509; 180/197; 368/2; 324/160, 128

[56] References Cited

U.S. PATENT DOCUMENTS

| | | | |
|---|---|---|---|
| 4,135,155 | 1/1979 | Kehl et al. | 324/178 |
| 4,333,146 | 6/1982 | Sinha et al. | 364/426 |
| 4,770,438 | 9/1988 | Sugasawa et al. | 364/424.05 |
| 4,989,923 | 2/1991 | Lee et al. | 364/426.02 |
| 5,058,019 | 10/1991 | Litkouhi | 364/426.02 |
| 5,157,596 | 10/1992 | Alcone | 364/572 |
| 5,235,529 | 8/1993 | Hanson et al. | 364/424.05 |

OTHER PUBLICATIONS

Adaptive Noise Cancelling: Principles and Applications, B. Widrow et al., Proceedings of the IEEE, vol. 63, No. 12, Dec. 1975.
Adaptive Estimation of Time Delays in Sampled Data Systems, D. Etter, IEEE Transactions on Acoustics, Speech, and Signal Processing, vol. ASSP-29, No. 3, Jun. 1981.

Primary Examiner—Jack B. Harvey
Assistant Examiner—Craig Steven Miller
Attorney, Agent, or Firm—H. P. Gortler; M. W. Sales; W. K. Denson-Low

[57] ABSTRACT

A system and method for determining the speed of a vehicle independent of angular wheel rotation rates is provided. The system generates time-varying signals corresponding to the vertical acceleration of the front and rear wheels. The front and rear wheel signals include corresponding perturbations caused by the wheels crossing road disturbances such as bumps. A time lag occurs between perturbations in the rear wheel signal and corresponding perturbations in the front wheel signal. An adaptive algorithm correlates the signals for various time delay values until a time delay value is determined which maximizes the correlation between the two signals. The calculated time delay value corresponds to the actual time lag between the front and rear wheels occurring before the rear wheels encounter a road disturbance previously encountered by the front wheels. Thus, the invention provides a determination of the actual speed of the vehicle determined independently from the angular rotation rates of the wheels.

9 Claims, 5 Drawing Sheets

ABSOULTE VELOCITY SENSOR

FIELD OF THE INVENTION

The invention generally relates to an absolute velocity sensor for a vehicle and, in particular, to an absolute velocity sensor for use with an antilock braking system of the automobile.

BACKGROUND OF THE INVENTION

Antilock braking systems are commonly used in vehicles to improve braking effectiveness and, in particular, to prevent wheel lockup during panic braking. During braking, a conventional antilock braking system attempts to determine whether any or all of the tires of the vehicle have lost traction with the road. If traction has been lost, the antilock braking system suspends braking of the wheel until traction resumes. In this manner, wheel lockup during a panic stop is avoided. Also, braking and traction are improved on slick surfaces such as snow or ice.

To determine whether a tire has lost traction, the conventional antilock braking system first determines the angular rotation rate of each wheel The system then converts the angular rotation rate of each wheel to a corresponding effective forward speed. Next, the system estimates the actual speed of the vehicle by averaging the effective forward speed of the four wheels. The system then compares the estimated forward speed of the vehicle with the effective forward speeds of each individual wheel. A discrepancy indicates that traction has been lost.

Thus, the conventional antilock braking system must first estimate vehicle speed from a combination of individual wheel rotation rates. However, an estimate based on a combination of individual wheel rotation rates is inaccurate if one or more of the wheels is slipping, and grossly inaccurate if all four wheels simultaneously lock up.

The forward speed of the vehicle is preferably measured independently from the individual rotational rates of the tires. Unfortunately, an independent determination of the speed of the vehicle is difficult to achieve with conventional techniques. Heretofore, only sophisticated and expensive techniques were available for determining the speed of a vehicle independently from the angular speed of the wheels. Exemplary techniques include inertial accelerometer systems or doppler systems using radar or sonar reflections to measure vehicle speed relative to the ground. Such techniques, commonly employed only in aircraft, are expensive, complicated, and often unreliable.

In the conventional antilock braking system, if traction has been lost, the system momentarily releases the brake on the wheel that has been determined to be slipping. Ideally, the brake is released only for the minimum time sufficient to allow the slipping wheel to regain traction and begin rolling on the road surface. This optimum release time is estimated by using the coefficient of friction between the wheels and the road surface, with the coefficient of friction estimated from the angular deceleration of the wheel and from its inertia.

However, such estimates are unreliable, and the performance of the antilock braking system is degraded by an incorrect estimate of the coefficient of friction. For example, if the brakes are applied while a wheel is airborne, the system will incorrectly respond.

Further, the conventional antilock braking system requires an accurate determination of the forward velocity of the wheels based on the angular velocity and the tire radius. However, effective tire radius can vary significantly, thus rendering an inaccurate calculation of the forward velocity of the wheel.

The problems inherent in conventional antilock braking systems also occur in conventional vehicle traction control systems, because traction control systems also require a determination of the forward speed of the vehicle.

As can be appreciated, there is a need to provide an improved velocity sensor for a vehicle which does not rely on angular wheel velocities to determine the forward velocity of the vehicle, and does not require an estimation of the coefficient of friction between the tires and the ground.

SUMMARY OF THE INVENTION

Accordingly, it is an object of the invention to provide a new and improved vehicle absolute velocity sensor;

It is a further object of the invention to provide a velocity sensor for a vehicle which does not require a determination of the angular rotation rate of wheels of the vehicle;

It is a further object of the invention to provide a velocity sensor for a vehicle which correctly determines the speed of the vehicle despite wheel lockup;

It is a further object of the invention to provide a velocity sensor for a vehicle which accurately determines the speed of the vehicle on any driving surface;

It is a further object of the invention to provide the velocity sensor in combination with an antilock braking system; and It is a further object of the invention to provide an antilock braking system which does not require an estimation of the coefficient of friction of the tires of the vehicle to determine the duration for suspending braking of a slipping tire.

These and other objects of the invention are achieved by a system for determining the speed of a vehicle wherein vertical acceleration of the front wheel is compared to the vertical acceleration of the rear wheel to determine a time lag occurring between the front and rear wheels. The time lag is determined by comparing perturbations in the front wheel vertical acceleration caused by road bumps and the like to corresponding perturbations in the rear wheel vertical acceleration caused by the same road bumps. Means are provided for calculating the forward speed of the vehicle from the time lag with the wheel base of the vehicle.

Thus, the invention exploits common road disturbances such as bumps, grooves, and rough pavement to determine the forward speed of the vehicle by measuring the time lag occurring between the front wheels encountering the road disturbances and the rear wheels encountering the same road disturbances. The system converts this time lag into a forward rate of speed by dividing the predetermined wheel base of the vehicle by the time lag.

The system detects the road disturbances by measuring slight perturbations in the vertical acceleration of the wheels caused by the wheels crossing the road disturbances. Preferably, an accelerometer is mounted to each wheel for individually measuring the vertical acceleration of the wheels. The accelerometers are sufficiently sensitive such that even slight road disturbances, such as those occurring on a slick or icy surface, are reliably detected.

Each accelerometer outputs a continuous time-varying signal corresponding to the measured vertical acceleration. The continuous signals are converted to digital signals comprised of successive time steps by an analog-to-digital converter.

The front wheel output signals are designated reference signals, and the rear wheel output signals are designated comparison signals. For each successive time step, the system calculates the time delay needed to minimize the difference, i.e. squared error, between the comparison signal and the reference signal. This calculation continues for each successive time step such that the estimate of the time lag is continuously updated and improved.

Preferably, the comparison means comprises an adaptive noise cancellation algorithm. The adaptive noise cancellation algorithm receives initial values of the comparison and reference signals. From the initial values of the comparison and reference signals, the system calculates an initial gradient of an integrated square error function. The integrated square error function represents the sum of the squares of the differences between corresponding values of the comparison and reference signals. The system then proceeds to calculate and estimate an initial time lag value from the initial gradient.

The system successfully inputs new values of the comparison and reference signals. For each new pair of values, the system recalculates the gradient of the integrated square error function and combines the gradient with the previous estimate of the time lag to produce an updated estimate of the time lag.

Upon convergence of the algorithm, each updated computation time lag value provides a current best estimate of the actual time lag between the front wheels and the rear wheels.

Forward speed of the vehicle is determined by numerically dividing the wheel base of the vehicle by the estimate of the actual time lag. The adaptive noise cancellation system is preferably implemented within a microprocessor.

In a preferred embodiment, the above-summarized system for measuring vehicle speed is implemented within an antilock braking system. The antilock braking system independently determines the angular rotation rate of the wheels and calculates an effective forward speed of each wheel based on the rotational rate of the wheel. The antilock braking system then compares the actual forward speed of the vehicle with the effective wheel speed derived from the angular rotation rate of each wheel.

A discrepancy between these two values is an indication that traction has been lost for that wheel. The antilock braking system then suspends braking of the wheel or wheels which have lost traction, to thereby allow the wheels to regain traction.

Braking is suspended until the effective forward speed of the slipping wheel matches the actual forward speed of the vehicle. Preferably, the vertical acceleration of the left and right wheels is measured separately.

In accordance with an alternative embodiment, the invention is implemented as a method for determining the speed of a vehicle. The method comprises the steps of generating a time-varying reference signal corresponding to vertical acceleration of a front wheel of the vehicle, generating a time-varying comparison signal corresponding to vertical acceleration of a rear wheel, comparing the reference signal and the comparison signal to determine a time lag value occurring between corresponding perturbations in the reference signal and comparison signal caused by the vehicle passing over the same road disturbance, and calculating the true vehicle speed by dividing the wheel base of the vehicle by the calculated time lag value.

In all embodiments, the invention provides a determination of the actual speed of the vehicle without relying upon a determination of the angular rotation rate of the wheels. Thus, the actual speed of the vehicle is correctly determined despite wheel lockup which may occur during a panic stop.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein.

Figure 1:
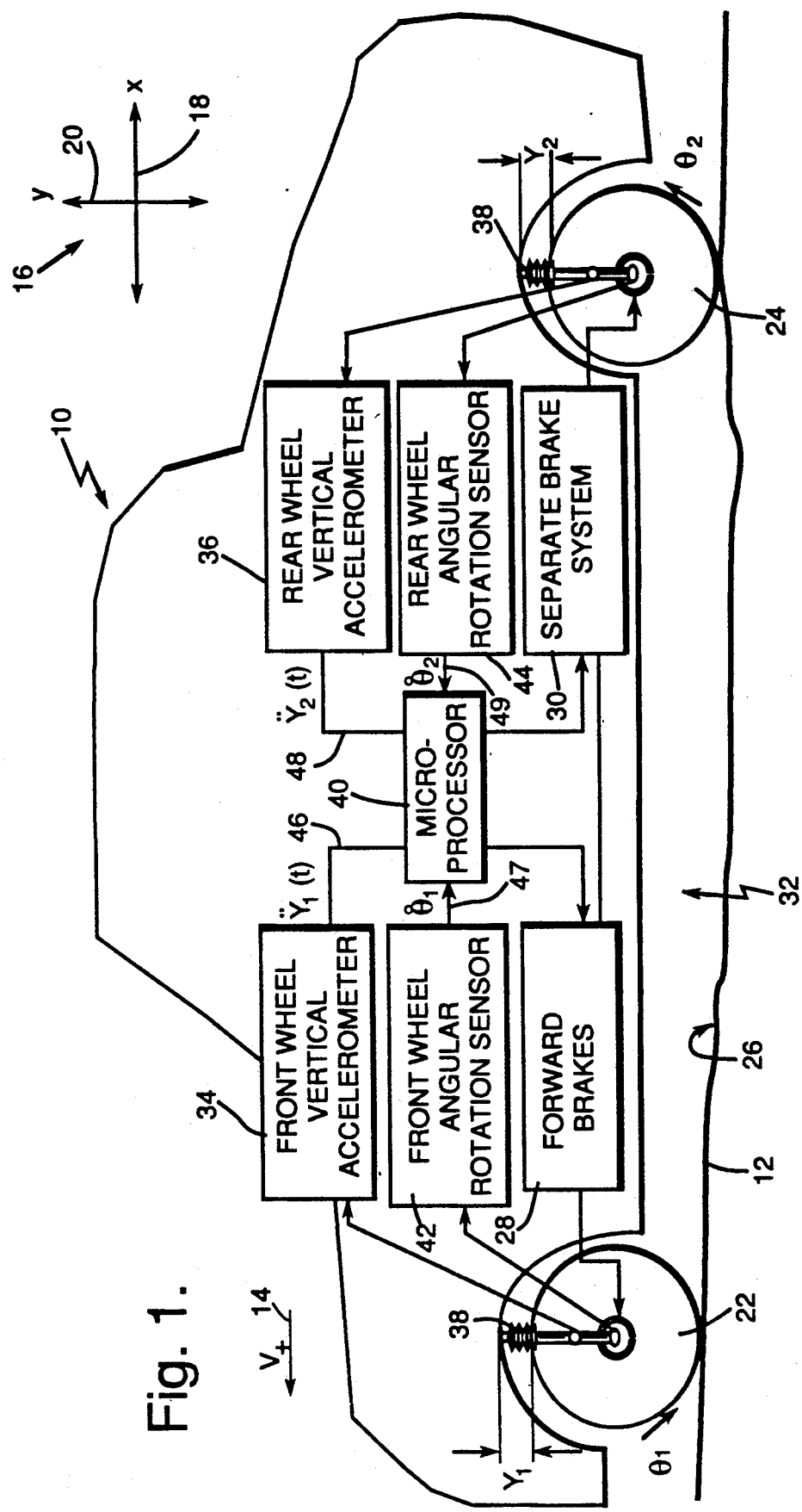
FIG. 1 provides a general overview, in schematic form, of a preferred embodiment of the invention.

Referring to FIG. 1, a general overview of the invention is shown. In FIG. 1, a vehicle 10 is shown traversing a road surface 12 at a forward velocity $v_t$ represented by arrow 14. A cartesian coordinate system 16 having a horizontal X-axis 18 and a vertical Y-axis 20 is also provided. Vehicle 10 is traversing road surface 12 in the positive X direction.

Vehicle 10 includes a front wheel 22 and a rear wheel 24. For clarity, only the front left and rear left wheels of the vehicle 10 are represented in FIG. 1.

As vehicle 10 traverses road surface 12, wheel 22 rotates through an angle $\Theta_1$ at an angular rate $\dot{\Theta}_1$. Rear wheel 24 rotates through an angle $\Theta_2$ at an angular rate $\dot{\Theta}_2$.

As a consequence of road bumps or disturbances, generally denoted 26 in road surface 12, wheels 22 and 24 deflect up and down. Vertical displacement of front wheel 22 is represented by $y_1$, and vertical displacement of rear wheel 24 is represented by $y_2$.

Front wheel 22 includes a brake system 28, and rear wheel 24 includes a separate brake system 30. An antilock braking system 32, shown schematically in FIG. 1, determines whether either front wheel 22 or rear wheel 24 has lost traction with road surface 12 and suspends braking of the slipping wheel until slipping stops. Antilock braking system 32 determines whether either of the wheels is slipping by determining the true forward velocity $v_t$ of the vehicle, determining the individual effective forward velocities of the front and rear wheels, $v_1$ and $v_2$, respectively, measured from their angular rotation rates, and comparing the true forward velocity $v_t$ with the effective wheel velocities $v_1$ and $v_2$. A discrepancy between the velocities is an indication that the wheels are slipping over the road surface.

To this end, antilock braking system 32 includes a front wheel vertical accelerometer 34 for measuring the vertical acceleration $\ddot{y}_1$ of front wheel 22. A rear wheel vertical accelerometer 36 measures the rear wheel vertical acceleration $\ddot{y}_2$. Vertical accelerometers 34 and 36 are conventional in construction and may be mounted in any suitable manner to the front and rear wheels to measure vertical acceleration. Thus, the vertical accelerometers may be mounted to shock absorbers 38, as shown, or may alternatively be mounted to axles or wheel mounts (not shown).

As vehicle 10 traverses road surface 12, wheels 22 and 24 are displaced upwardly and downwardly while passing over road bumps 26. Vertical accelerometer 34 generates a time-varying signal $\ddot{y}_1(t)$ corresponding to the up and down movement of the front wheel. Rear wheel vertical accelerometer 36 likewise generates a continuous time-varying signal $y_2(t)$ corresponding to the vertical movement of rear wheel 24.

A microprocessor 40 receives vertical acceleration signals $\ddot{y}_1(t)$ and $\ddot{y}_2(t)$ and compares the signals, in a manner described below, to determine a time lag occurring between perturbations in the front wheel acceleration caused by the front wheel traversing a road bump and corresponding perturbations in the rear wheel acceleration caused by the rear wheel traversing the same road bump shortly thereafter. The time lag thus represents the amount of time it takes the rear wheel to reach a road bump recently traversed by the front wheel. Microprocessor 40 calculates the true forward velocity of the vehicle $v_t$ dividing the wheel base of vehicle 10 by the calculated time lag.

Having determined the true forward velocity of the vehicle, microprocessor 40 next determines the effective velocities of the front and rear wheels as measured by their angular rotation rates. To this end, antilock braking system 32 is provided with a pair of angular rotation sensors 42 and 44 mounted coaxially with the front and rear wheels, 22 and 24 respectively. Front wheel angular rotation sensor 42 generates a signal corresponding to the angular rotation rate of front wheel 22, represented by $\dot{\Theta}_1$. Rear wheel angular rotation sensor 44 generates a signal corresponding to the rear wheel angular rotation rate $\dot{\Theta}_2$.

Microprocessor 40 calculates the effective forward wheel velocities from a comparison of $\dot{\Theta}_1$ and $\dot{\Theta}_2$ and the tire radii $r_1$ and $r_2$. Microprocessor 40 compares true vehicle velocity $v_t$ with effective forward wheel velocity $v_1$, $v_2$ to determine if a discrepancy exists. Thus, for example, if effective velocity $v_1$ is substantially slower than the true vehicle velocity $v_t$, then the front wheel has lost traction with the road surface. Likewise, if the rear wheel effective velocity $v_t$ is substantially different from the true vehicle velocity, the rear wheel has lost traction.

If the front wheel has lost traction, microprocessor 40 controls forward brakes 28 to suspend braking of the front wheels. Microprocessor 40 continues to monitor the true forward velocity of the vehicle and the effective forward velocity of the front wheel. Braking remains suspended until microprocessor 40 determines that the effective forward velocity of the front wheel has become substantially equal with the true vehicle velocity $v_t$. Once the velocity has equalized, microprocessor 40 signals forward brakes 28 to resume braking. Likewise, if microprocessor 40 has determined that rear wheel 24 has lost traction, microprocessor 40 signals rear brakes 30 to suspend braking until traction resumes.

Figure 2:
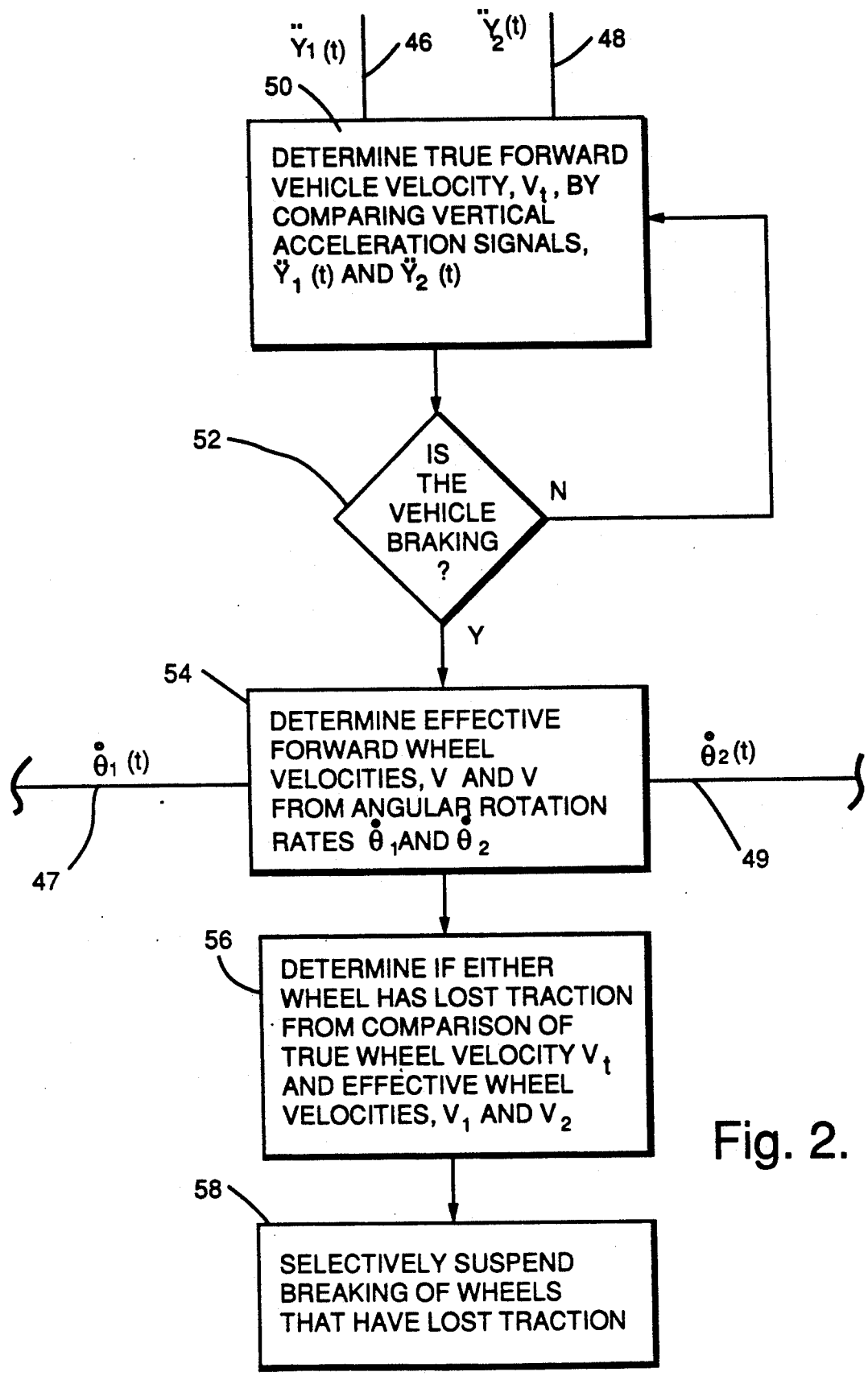
FIG. 2 provides a schematic representation of steps executed by the microprocessor of the invention.

The thus-described steps executed by microprocessor 40 are summarized in schematic form in FIG. 2.

Initially, microprocessor 40 receives front and rear wheel vertical acceleration signals along lines 46 and 48. At 50, the microprocessor determines the true forward vehicle velocity $v_t$ from a comparison of the vertical acceleration signals.

At 52, the microprocessor determines whether the brakes of the vehicle are being pressed by the driver. To this end, a preexisting control signal provided between the brake pedal of the driver's compartment or the brake master cylinder of the vehicle and the front and rear brakes may be routed to the microprocessor. If the vehicle is not braking, the microprocessor need not determine whether the wheels are slipping. Therefore, the microprocessor immediately returns to step 50 to receive new vertical acceleration values to update the estimate of the true forward velocity $v_t$. The microprocessor continues to execute in a loop to successively reestimate the true forward vehicle velocity until the brakes are activated by the driver.

Once the brakes are activated, execution continues at step 54, where the microprocessor receives the angular rotation rates $\dot{\Theta}_1$ and $\dot{\Theta}_2$ for the front and rear wheels along lines 47 and 49 and determines the effective forward wheel velocities. As discussed above, the effective forward wheel velocities are determined from a comparison of the effective radii of the front and rear wheels with the angular rotation rates.

Next, at 56, the microprocessor compares the front and rear wheel effective forward velocities as determined by step 54 with the true forward vehicle velocity as determined by step 50. If a discrepancy exists, the microprocessor selectively suspends braking of the spinning wheels at step 58. Once braking is suspended, the microprocessor returns to step 50 to update the value for the true vehicle velocity.

Figure 3:
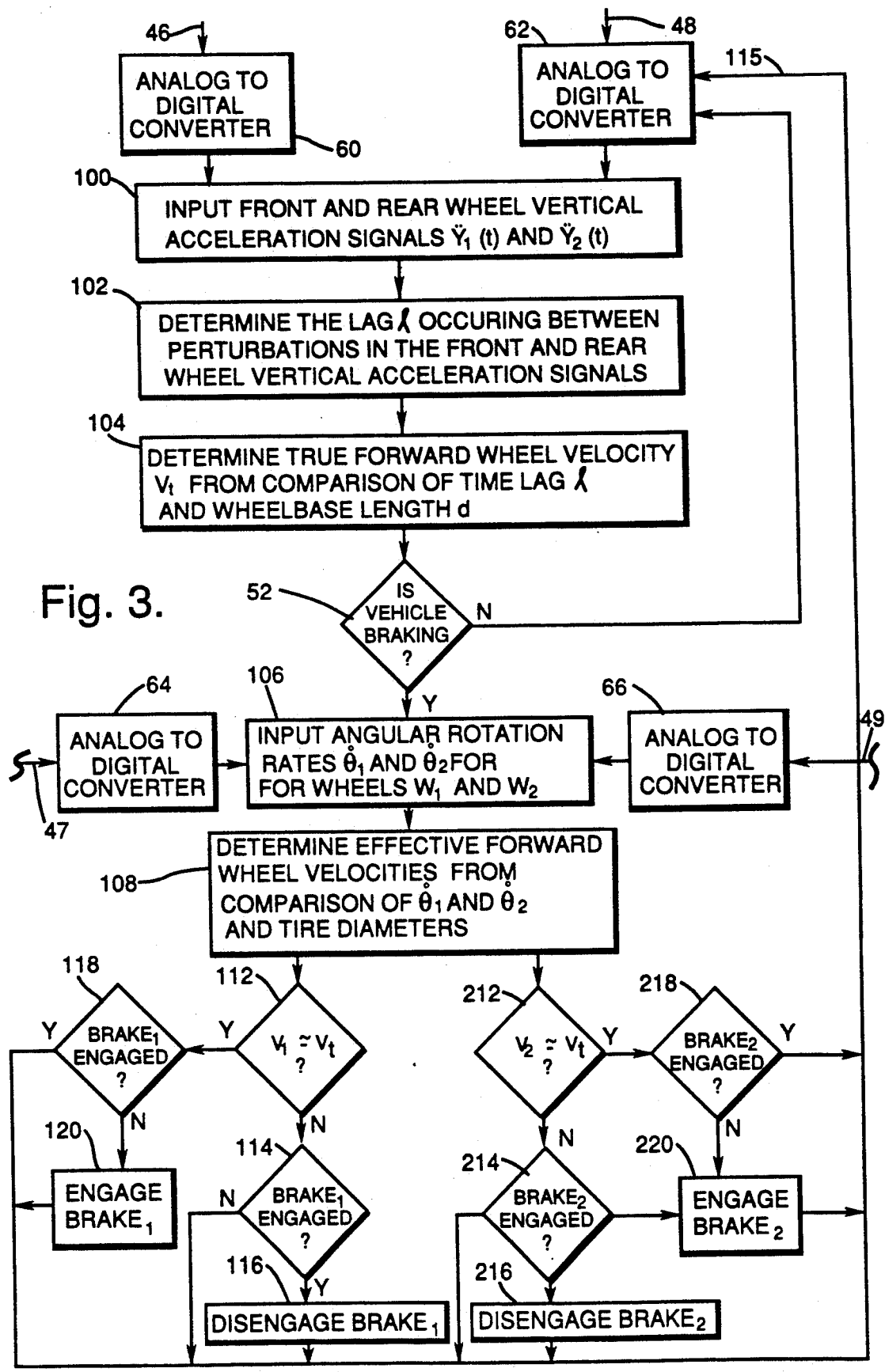
FIG. 3 provides a schematic representation, somewhat in more detailed form, of the steps executed by the microprocessor of the invention.

In FIG. 3, the microprocessor steps summarized in FIG. 2 are set forth in greater detail. Analog signals are received along signal lines 46 and 48 from vertical accelerometers 34 and 36 (FIG. 1). A pair of analog-to-digital converters 60, 62 are provided to convert the analog vertical acceleration signals $\ddot{y}_1$ and $\ddot{y}_2$ into digital signals for input to the microprocessor. The frequency at which the analog signals are sampled to produce the digital signals is a configurable parameter of the system. However, a sampling rate of at least 200 samples per second is preferred. Analog-to-digital converters 60 and 62 each produce a sequence of discrete numeric values, with each value separated by a time step $\Delta t$.

At step 100, the microprocessor receives the latest values for the front and rear wheel vertical accelerations, $\ddot{y}_1(t)$ and $\ddot{y}_2(t)$, respectively.

At 102, the microprocessor applies an adaptive noise cancellation algorithm to compare the front and rear wheel vertical acceleration signals to determine a time lag occurring between perturbations in the front and rear wheel signals caused by the front and rear wheels successively traversing road bumps or other disturbances. The adaptive noise cancellation algorithm, described in detail below, calculates an estimate of the gradient of the difference of the front and rear wheel accelerometer signals. The microprocessor then uses the gradient to iteratively solve the delay between the signals. For each successive time step, the algorithm recalculates the time lag value by applying the latest discrete values for the front and rear wheel vertical accelerations received from the analog-to-digital converters. Thus, at step 102 the microprocessor generates an updated time lag value 1.

At 104, the microprocessor uses the updated time lag value 1 along with the wheel base length of the vehicle d to estimate the true forward vehicle velocity $v_t$. For step 104, the microprocessor merely divides the wheel base length d by the time lag value 1 to obtain the estimate of the true forward vehicle velocity $v_t$.

At step 52, the microprocessor determines, as discussed above, whether the operator is currently applying the brakes to the vehicle. If the brakes are not being applied, the microprocessor returns immediately to step 100 to input new values for the front and rear wheel vertical acceleration signals. At step 102, the microprocessor updates the time lag value by applying the adaptive noise cancellation algorithm to the new vertical acceleration values and, at step 104, the microprocessor updates the estimate of the forward vehicle velocity $v_t$. Steps 100, 102, and 104 are continuously reexecuted until the operator of the vehicle applies the brakes, at which time execution continues from step 52 to step 106

A second pair of analog-to-digital converters, 64 and 66, receive analog signals from analog rotation sensors 42 and 44 (FIG. 1), which provide the angular rotation rates of the front and rear wheels, respectively, along signal lines 47 and 49. Digital rotation sensors are also available.

At step 106, the microprocessor receives the latest discrete values for the angular rotation rates $\dot{\theta}_1$ and $\dot{\theta}_2$. The sampling rate for analog-to-digital converters 64 and 66 is preferably set to the same sampling rate as analog-to-digital converters 60 and 62 to provide updated values for the front and rear wheel angular rotation rates every $\Delta t$ seconds. However, these sampling rates may be different.

Microprocessor 40 converts the angular rotation rates to effective forward velocities by multiplying the angular rotation rates in radians/sec by the radii of the wheels. With the front wheel radius represented by $r_1$, the effective forward velocity $v_1$ of the front wheel is thus determined by the equation $v_1 = r_1 \dot{\theta}_1$. With the radius of the rear wheel represented by $r_2$, the effective forward velocity $v_t$ of the rear wheel is determined from the equation $v_t = r_2 \dot{\theta}_2$.

Preferably, the microprocessor is preprogrammed with the values for the effective radii of the front and rear wheels. The microprocessor may store a single value representing an average tire radius or may store a range of values providing differing wheel radii for differing angular rotation rates of the wheels and vehicle loadings. A range of values is preferable, since the effective radius of a rotating tire varies according to its rate of rotation and load.

After step 108, the microprocessor possesses updated estimates of the true vehicle velocity $v_t$ and the effective front and rear wheel velocities $v_1$ and $v_2$. The microprocessor is thus prepared to compare the true vehicle velocity with the effective wheel velocities to determine whether a discrepancy exists between these velocity values. This comparison proceeds along a parallel processing architecture, represented by separate process flow lines 110 and 210. Steps following along control line 110 execute a comparison of the true vehicle velocity with the front wheel effective velocity $v_1$. Steps following control line 210 execute a comparison of the rear wheel effective velocity $v_2$ with the true vehicle velocity $v_t$.

First considering the front wheel effective velocity $v_1$, at step 112 the microprocessor compares $v_1$ with $v_t$ to determine if a discrepancy exists between these two values. What constitutes a discrepancy is a configurable parameter (i.e., the resolution) of the system. However, a discrepancy of at least 5% provides a suitable discrepancy ratio sufficient to determine whether the front wheel has lost traction. A lower or higher discrepancy ratio ratio may alternately be used. However, for a low discrepancy ratio, the microprocessor may occasionally incorrectly determine that the front wheel has lost traction when, in fact, it has not. Such an erroneous determination may occur as a result of inaccuracies in the adaptive noise cancellation algorithm of step 102.

If a discrepancy exists between $v_1$ and $v_t$, execution proceeds to step 114, where the microprocessor determines whether the front wheel brake is currently engaged. The determination at step 114 of whether the forward brake is engaged is separate from the determination at step 52 of whether the operator has applied the brakes. Although the operator may be currently applying the brakes, the forward brake may nevertheless be disengaged as a result of a previous determination by the microprocessor to disengage the forward brake. If the forward brake has already been disengaged, no further processing is required. Hence, execution continues along return line 115 such that the microprocessor may reexecute step 100 to receive new values for the front and rear wheel vertical accelerations.

If, however, the microprocessor determines at step 114 that the forward brake is currently engaged, execution proceeds to step 116, wherein the microprocessor signals the forward brake to disengage. Thus, the sequence of steps 114 and 116 occurs only when the microprocessor has determined that the forward wheel has lost traction and the operator is currently applying the brakes, but the brakes have not yet been disengaged. The brakes remain disengaged until the microprocessor determines, at step 112, during a subsequent iteration, that the forward effective wheel velocity has become substantially equal to the true forward vehicle velocity, at which time execution continues at step 118. Again, the microprocessor determines whether the forward brake is currently engaged. If the forward brake is currently disengaged as a result of a previous execution of step 116, execution continues at step 120, where the microprocessor signals the forward brake to reengage. The microprocessor then returns to step 100 to receive updated values for the front and rear wheel vertical accelerations. Step 120 is executed only when the microprocessor first determines that the forward wheel has regained traction after the forward brake had been disengaged by step 116. Thus, the sequence of steps 112, 118, and 120 operate to reengage the forward brake once the forward wheel resumes traction. Steps 112, 114, and 116 operate to disengage the forward brake whenever the forward wheel loses traction with the road.

While steps 110 and following are executed by the microprocessor, steps 210 and following are simultaneously executed. A conventional parallel processing architecture may be provided to allow for simultaneous processing of the rear wheel braking condition. At step 212 the microprocessor determines whether a discrepancy exists between the rear wheel effective vertical velocity $v_2$ and the true vehicle velocity $v_t$. If a discrepancy exists, execution continues at step 214, wherein the microprocessor determines whether the rear wheel brake is currently engaged. If so, the microprocessor disengages the rear wheel at step 216. If, however, the rear wheel brake had been previously disengaged by a prior execution of the steps of the microprocessor, execution returns along control line 115 to enable the microprocessor to receive and process new values for the front and rear wheel vertical acceleration.

If, at step 212, the microprocessor determines that no discrepancy exists between the rear wheel effective forward velocity and the true vehicle velocity, then execution continues at step 218, wherein the microprocessor determines whether the rear wheel brake is currently engaged. If not, the microprocessor engages the rear brake at step 220. Thus, steps 212, 218, and 220 operate to reengage the rear wheel brake whenever the system has determined that the rear wheel has regained traction with the road.

Thus, the microprocessor operates in parallel to simultaneously determine whether the front or rear wheel brakes are to be engaged or disengaged. The parallel processing is preferred over a sequential processing because parallel processing allows for the fastest possible determination of whether the front and rear wheels need to be engaged or disengaged. A prompt determination is necessary to minimize the possibility of a vehicle accident from occurring should either the front or rear wheel lose traction during braking.

The means by which the adaptive noise cancellation algorithm of step 102 of the microprocessor operates to determine the time lag between the front and rear vertical acceleration signals will now be described with reference to FIGS. 4a, 4b, and 5.

Figure 4A:
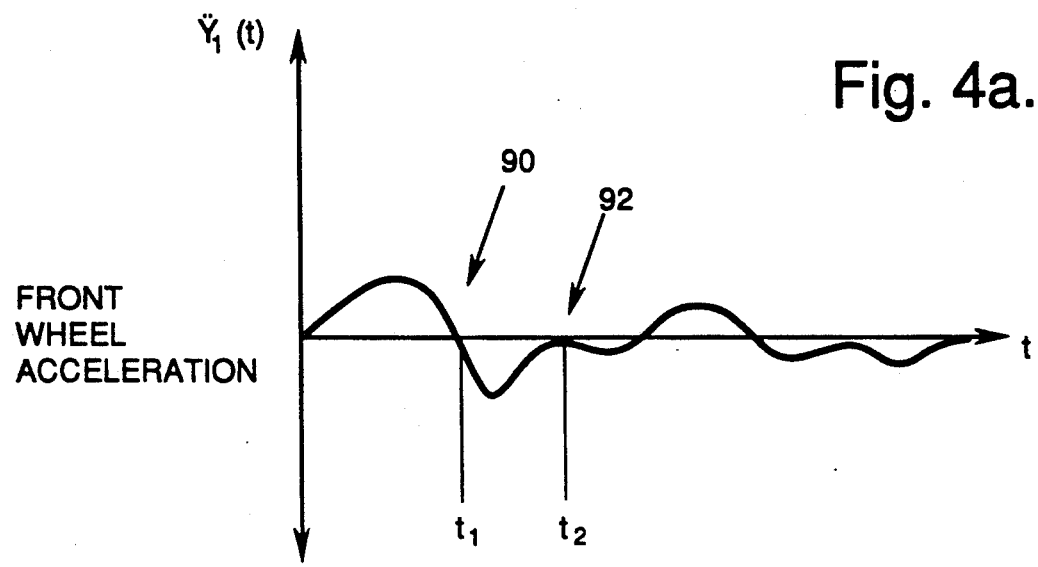
FIG. 4a graphical representation of a time-varying vertical acceleration signal corresponding to the vertical acceleration of a front wheel of a vehicle.

In FIG. 4a, a graphical representation of an exemplary front wheel vertical acceleration signal $\ddot{y}_1(t)$ is provided. As can be seen, the vertical acceleration signal comprises a continuing sequence of perturbations of varying magnitude and duration. Each perturbation represents a change in the vertical acceleration of the front wheel caused by the wheel traversing a road bump or groove. For example, a first perturbation 90 is centered about time $t_1$ and represents the response of the front wheel caused by striking a road bump or groove at time $t_1$. A second, shallower perturbation occurring at time $t_2$ is represented by reference numeral 92.

Figure 4B:
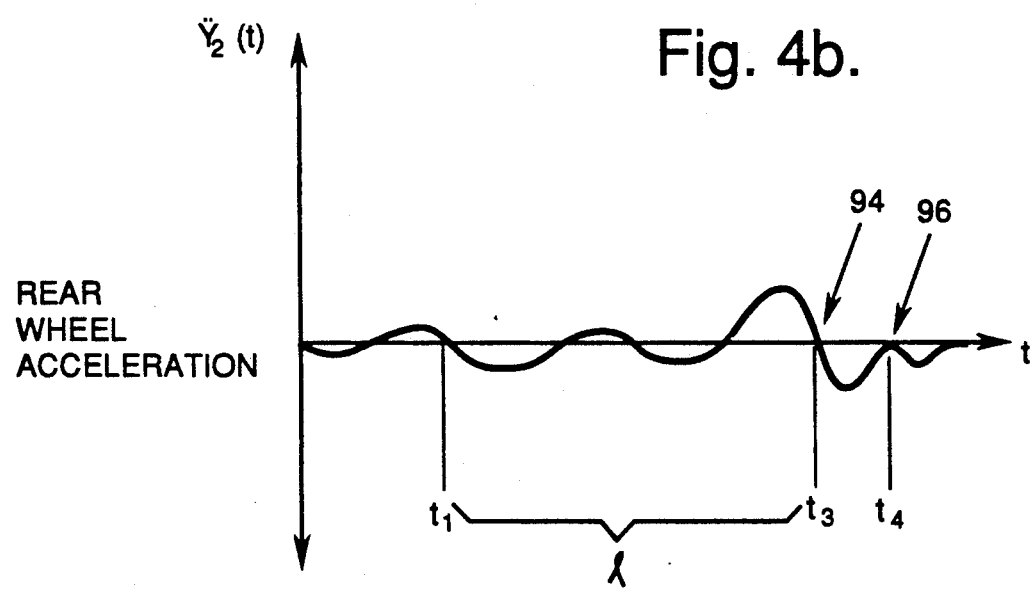
FIG. 4b is a graphical representation of a time-varying vertical acceleration signal corresponding to the vertical acceleration of a rear wheel of a vehicle.

FIG. 4b provides a graphical representation of an exemplary signal corresponding to the rear wheel acceleration. As can be seen, the rear wheel acceleration $\ddot{y}_2$ includes a first perturbation 94 occurring at time $t_3$ corresponding to perturbation 90 of the front wheel vertical acceleration occurring at time $t_1$. Likewise, the rear wheel vertical acceleration includes a second, shallower perturbation 96 occurring at time $t_4$ and corresponding to perturbation 92 of the front wheel acceleration occurring at time $t_2$. The time delay 1 represents the delay between perturbations in the front wheel vertical acceleration signal and the corresponding perturbations in the rear wheel vertical acceleration signal. Thus, 1 may be represented as $t_3-t_1$ or $t_4-t_2$.

In FIGS. 4a and 4b, only a small portion of continuously-changing vertical acceleration signals is provided. However, throughout the journey of the vehicle, the rear wheel vertical acceleration will normally closely match the front wheel vertical acceleration when the vehicle is travelling in or near a straight line, although delayed by time lag 1. The duration of time lag 1, of course, depends upon the forward velocity of the vehicle.

In practice, the front and rear wheel vertical acceleration signals are influenced by noise and may not be identical. Further, the rear wheel may respond somewhat differently to a road disturbance previously traversed by the front wheel. Thus, a perturbation appearing in a rear wheel vertical acceleration signal may be of greater or lesser magnitude than that of the front wheel vertical acceleration. Nevertheless, the front and rear wheel signals will generally correspond to a sufficient precision to allow an estimation of the time lag 1 to be calculated from a comparison of the two signals unless the vehicle is turning sharply.

A variety of signal processing algorithms or techniques may be applied to compare the front and rear wheel signals to determine the time lag 1 occurring between the signals. For example, a plurality of acceleration values covering a span of time could be stored in the microprocessor. Then, for each time step, the microprocessor could sum or multiply together and integrate all of the values stored for each signal to determine a cross-correlation value for the two signals. The microprocessor would calculate the correlation value while simultaneously varying the time lag 1, thus yielding a plurality of correlation values. The processor could then choose the correlation value which represents the maximum correlation between the signals. The time lag 1 corresponding to the value of maximum correlation thus provides the best estimate of the time lag occurring between the front and rear signals.

However, in accordance with a preferred embodiment of the invention, an adaptive noise cancellation algorithm is applied to the front and rear wheel signals to more efficiently calculate the estimation of the time lag. With the adaptive noise cancellation algorithm of the invention, microprocessor 40 need not perform a set of correlation calculations for each time step. Rather, for each new time step, the microprocessor updates a previous estimate of the time lag by applying the latest values for the front and rear wheel vertical acceleration. Thus, only one minor calculation is performed per time step, rather than the plurality of correlations required by the method described above.

The adaptive noise cancellation algorithm employed by the invention may be described mathematically as follows:

$\ddot{y}_1(t-1)=$ the front wheel vertical acceleration signal shifted by time lag 1

$\ddot{y}_2(t)=$ the rear wheel vertical acceleration signal

An integrated square error function between the signals is represented by:

$$E(\mathbf{l}) = \int [\ddot{y}_2(t) - \ddot{y}_1(t-\mathbf{l})]^2 \, dt. \quad (1)$$

Equation (1) may be expanded to:

$$E(\mathbf{l}) = \int [\ddot{y}_2(t)]^2 \, dt - 2 \int [\ddot{y}_2(t) \ddot{y}_1(t-\mathbf{l})] dt + \int [\ddot{y}_1(t-\mathbf{l})]^2 dt \quad (2)$$

The error function is minimized when the middle term of Equation (2) is maximized. This occurs when l equals the delay between the front and rear wheels hitting a given bump.

To determine a method for calculating l, first form the time derivative of the error function:

$$\frac{dE(\mathbf{l})}{dt} = [\ddot{y}_2(t) - \ddot{y}_1(t-\mathbf{l})]^2 \quad (3)$$

Next, form the variation or gradient of the error function time derivative with respect to l:

$$\frac{d}{d\mathbf{l}}\left[\frac{dE(\mathbf{l})}{dt}\right] = -2[\ddot{y}_2(t) - \ddot{y}_1(t)]\frac{d}{d\mathbf{l}}\ddot{y}_1(t-\mathbf{l}) \quad (4)$$

Equation (4) is numerically approximated by substituting:

$$\frac{d}{d\mathbf{l}}\ddot{y}_1(t-\mathbf{l}) \approx \frac{\ddot{y}_1(t+\Delta t) - \ddot{y}_1(t-\Delta t)}{2\Delta t} \quad (5)$$

where Equation (5) represents a double-sided approximation of $$\frac{d}{d\mathbf{l}}\ddot{y}_1(t-\mathbf{l})$$

using a time step of $\Delta t$.

Thus, the gradient $\nabla_\mathbf{l}$ (Equation 4) of the error function $E(\mathbf{l})$ is approximated as:

$$\nabla \approx -2[\ddot{y}_2(t) - \ddot{y}_1(t-\mathbf{l})]\left[\frac{\ddot{y}_1(t+\Delta t) - \ddot{y}_1(t-\Delta t)}{2\Delta t}\right] \quad (6)$$

By applying the conventional method of steepest descent, it can be shown that $$\mathbf{l}_{new} = \mathbf{l}_{old} - \mu \nabla, \quad (7)$$

where $\mathbf{l}_{new}$ represents a new approximation to l, $\mathbf{l}_{old}$ represents a previous approximation to l, and $\mu$ is an adjustable convergence factor.

Time lag l is iteratively calculated from Equation (7). Initially, a default value for $\mathbf{l}_{old}$ is chosen. Then, the gradient of Equation (6) is calculated using $\mathbf{l}_{old}$. A new approximation, $\mathbf{l}_{new}$, of the time lag is then calculated from Equation (7) by subtracting the just-calculated gradient from $\mathbf{l}_{old}$. Equations 6 and 7 may be iterated hundreds of times for each value of t to achieve a converged value for l. Convergence factor $\mu$ is applied to the gradient to improve the speed of convergence of and to maintain stability of Equation (7) during iteration. Once an updated approximation for the time lag $\mathbf{l}_{new}$ is determined, this value is used in Equation (6) to determine an updated value for the gradient. In this second calculation of Equation (6), the time t is incremented by an amount $\Delta t$. $\mathbf{l}_{new}$ is then updated by recalculating Equation (7) using the previous calculated time lag value with the newly-calculated gradient value.

Thus, Equations (6) and (7) are iteratively recalculated at successive times t to provide a continually updated estimate of the time lag l. The initial approximation for $\mathbf{l}_{old}$ may have been substantially different from the true value of the time lag. Accordingly, Equations (6) and (7) may need to be iteratively calculated for numerous time steps until Equation (7) converges on an accurate estimate for the time lag l. In practice, 200 to 300 iterations may be initially required before Equation (7) converges on a value for l. After the equations initially converge on an estimate for l, the equations are continually recalculated to update the time lag value to track changes in the forward velocity of the vehicle. The ability of these calculations to track rapid changes in the vehicle velocity is an important feature of the invention.

The velocity update rate is preferably between 200 and 400 Hz. Accordingly, the accelerometers operate preferably at 100 times those rates (i.e., 20~40 kHz), and the analog to digital converters operate at 200~400 Hz. Therefore, a time step of approximately 2.5~5 msec occurs between successive estimations of the time lag l. Since the preferred embodiment sets the delay iteration calculation within the acceleration sample period and runs the iteration at a much higher rate (1200 iterations/sample period), the delay calculation has a sufficient number of iterations for convergence.

The initial approximation for $\mathbf{l}_{old}$ is preferably chosen by dividing the wheel base of the vehicle d by 1 meter per second. Thus, $\mathbf{l}_{old}$ is initially chosen based on an assumption that the vehicle, when started, will initially be moving slowly. This initial estimate for time lag l is represented by $\mathbf{l}_{max}$. Thus, $\mathbf{l}_{max}$ generally represents the maximum time lag expected to occur between the front and rear wheels corresponding to the minimum velocity of the vehicle at which the antilock braking system is expected to operate. Hence, $\mathbf{l}_{max}$ is a configurable parameter of the system.

Figure 5:
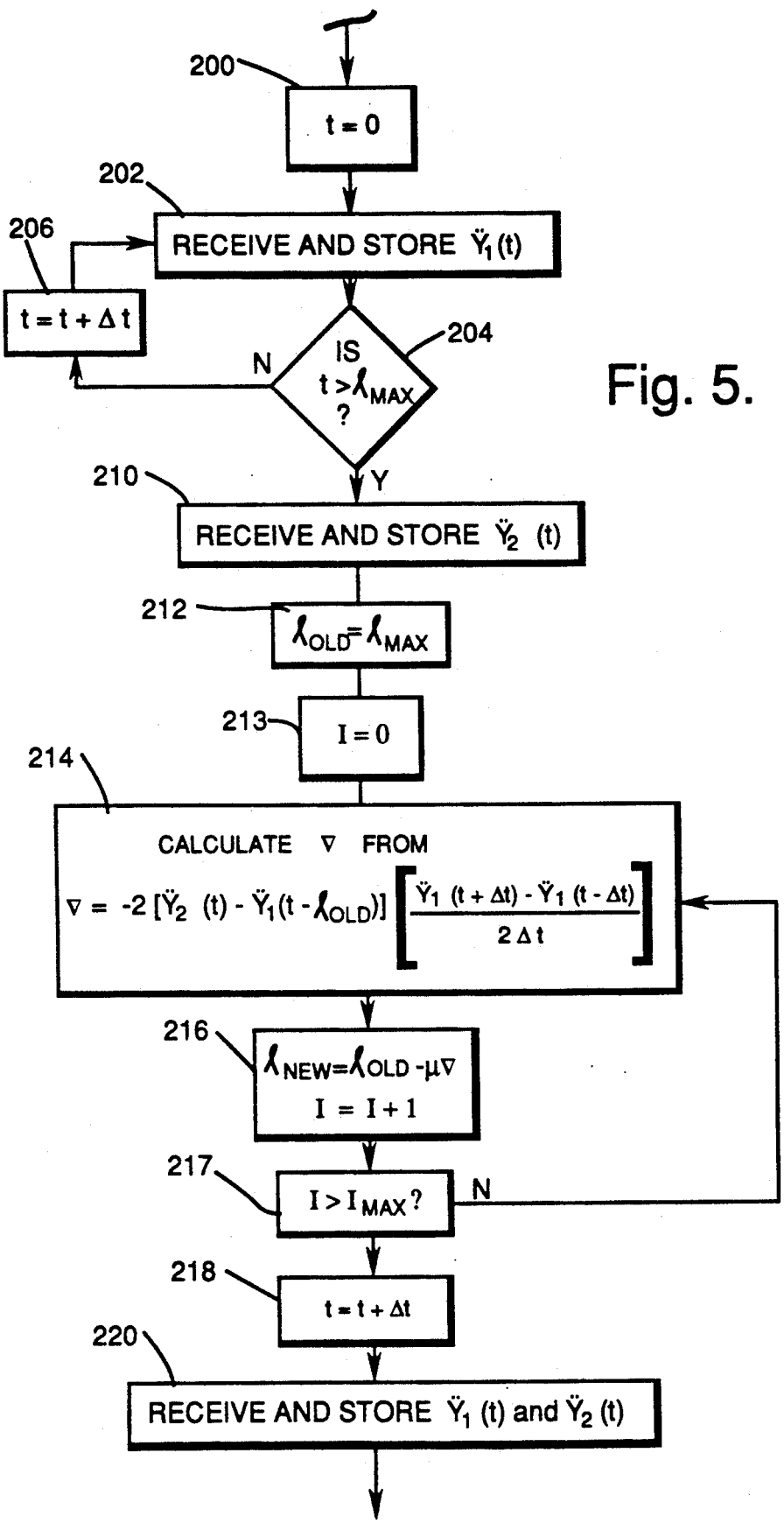
FIG. 5 is a schematic representation of the adaptive noise cancellation algorithm used by the microprocessor of the invention.

The process by which the microprocessor implements Equations (6) and (7) to iteratively calculate an approximation for the time lag l is shown in FIG. 5.

Initially, at 200, the time value t is set to 0. Next, at 202, the microprocessor receives and stores a front wheel vertical acceleration value for time t=0. At 204, the microprocessor determines whether current time t is greater than the maximum time lag value $\mathbf{l}_{max}$. If t is not greater than $\mathbf{l}_{max}$, and such will necessarily be the case for t=0, the microprocessor increments the time value by $\Delta t$, at 206. As noted above, $\Delta t$ represents the sampling rate of the analog-to-digital converters and thus represents the incremental time step occurring between successive values for the vertical acceleration period.

At 202, the microprocessor receives and stores a second value for the front wheel vertical acceleration corresponding to the time t=$\Delta t$. Steps 202, 204, and 206 are reexecuted until the time value is greater than $\mathbf{l}_{max}$, after which execution continues at step 210. All values for the front wheel acceleration are stored in a ring buffer.

Steps 202, 204, and 206 thus operate to receive and store a plurality of values for the vertical acceleration $\ddot{y}_1$ covering a time span of $\mathbf{l}_{max}$. This range of values for the vertical acceleration is required before the microprocessor can proceed to calculate a first approximation of the gradient from Equation (6), i.e., the microprocessor must have access to a sufficient range of values of $\bar{y}_1$ to be able to calculate the term $\bar{y}_2(t) - \bar{y}_1(t - l_{max})$ during the first iteration of Equations (6) and (7). In other words, the microprocessor must receive and store front wheel vertical acceleration values for at least the time it takes the rear wheel to cover the distance corresponding to the wheel base of the vehicle. The microprocessor cannot calculate an initial approximation for the time lag l until at least this minimum amount of time has elapsed.

At 210, the microprocessor inputs a first value for the rear wheel vertical acceleration.

At 212, the microprocessor sets the time lag variable $l_{old} = l_{max}$, the initial estimate for the time lag described above.

At 213, the microprocessor sets an inner loop iteration counter I=0.

At 214, the microprocessor calculates a first approximation for the gradient from Equation (6) by accessing the stored values for the front and rear wheel vertical accelerations for time values of $t+\Delta t$, $t-\Delta t$, and $t-l_{max}$. Values for the front wheel vertical acceleration are retrieved from the ring buffer.

At 216, the microprocessor uses the just-calculated gradient, a value for the adjustable convergence factor $\mu$, and the initial default value $l_{max}$ to calculate a new value for the time lag l according to Equation (7). Convergence factor $\mu$ is a configurable parameter of the system which may be experimentally determined. $\mu$ may be stored as a constant value or may be adaptively calculated during each iteration. The thus-calculated value for l represents the microprocessor's first iterative update to the initial default value $l_{max}$. Also at 216, the microprocessor increments inner loop counter I.

At 217, the microprocessor determines whether I has reached a maximum value $I_{max}$. $I_{max}$ is a configurable parameter of the system, and is preferably set to 1200. If I is less than $I_{max}$, the microprocessor returns to step 214 to calculate a new value for the gradient based on the same time step. Steps 214–217 provide an inner loop for calculating a value of l for a given time step.

After I reaches $I_{max}$, execution proceeds to step 218, where the microprocessor increments the time value, $t = t + \Delta t$, to enable the microprocessor to receive and process new values for the front and rear wheel vertical acceleration. These new values are received and stored by the microprocessor at step 220, after which execution returns to step 213 for calculation of an updated value for the gradient. Once a new value for the gradient is calculated at step 214, a new value for the time lag l may be calculated at step 216.

Steps 213, 218, and 220 represent an outer loop which operates to calculate a value for l for each new time step. The outer loop is continuously reexecuted to iteratively update the time lag value l for each new time increment. As noted above, several hundred iterations may be required before the microprocessor converges on an initial value for the time lag l, after which continued execution of the outer loop serves to update the time lag value to represent changes in the velocity of the vehicle.

Execution of the loop may proceed indefinitely until the vehicle's engine is turned off. Alternatively, the microprocessor may be reset every time the vehicle comes to a stop, at which time the time lag l is reset to $l_{max}$. As the vehicle slows to near a complete stop, the time lag between the front and rear wheels increases toward infinity, making it difficult for the algorithm of FIG. 5 to calculate accurate values for l. To solve this problem time lag l may be reset to $l_{max}$ if the vehicle velocity falls below $V_{min}$, where $V_{min}$ is a configurable parameter of the system. For example, $V_{min}$ may be set to a value corresponding to a time lag of 6 seconds between the front and rear wheels. Alternatively, the algorithm of FIG. 5 may be modified to adaptively calculate l for slow speeds.

Although not shown, the microprocessor may also be provided with additional process steps for calculating whether a converged value for l has been determined. Convergence occurs when the magnitude of the gradient term in Equation (7) drops below the resolution of the system. In such a case, values for the time lag l determined prior to convergence are merely discarded, rather than used to calculate a true vehicle velocity. Such is desirable, since a calculation of the true vehicle velocity may be inaccurate if based on an unconverged value for l. Also, $I_{max}$ may be adaptively calculated for each iteration of the outer loop to provide for optimal convergence speed.

Values for the front wheel vertical acceleration are stored in the ring buffer only until no longer needed, i.e., for $l_{max}$, then overwritten to thereby consume as little memory as necessary.

Table I provides exemplary values for some of the configurable parameters of the system.

TABLE I

| SYSTEM PARAMETERS | OUTER LOOP SAMPLE RATE (Hz) | |
|---|---|---|
| | 200 | 400 |
| Velocity resolution (m/sec) | $2.5 \times 10^{-3}$ | $1.25 \times 10^{-3}$ |
| Delay resolution (sec) | $3 \times 10^{-6}$ | $1.5 \times 10^{-6}$ |
| Cycle time (msec) | | |
| Outer loop (vel update) | 5 | 2.5 |
| Inner loop (convergence) (1200 cycles/cycle) | $4 \times 10^{-3}$ | $2 \times 10^{-3}$ |
| Operations/cycle | | |
| Inner loop | <10 | <10 |

In summary, the microprocessor iteratively calculates a time lag value l according to the process shown in FIG. 5 to determine a best estimate for the time lag occurring between the front and rear wheels. The microprocessor uses each estimate of the time lag to calculate the current forward velocity of the vehicle, which is compared with the effective forward velocities of the wheels as determined from their angular rotation rates. If a substantial discrepancy exists between the true forward vehicle velocity and the effective wheel velocities, the antilock braking system suspends braking of one or more of the wheels to allow the wheels to regain traction. Once traction is restored, as indicated from a substantial equality between the true forward vehicle velocity and the effective wheel velocities, the brakes are reapplied to resume effective braking of the vehicle.

Although shown and described with respect to only a single front wheel and a single rear wheel, the system, of course, operates to compare vertical acceleration signals from both the left front and right front wheels with the left rear and right rear wheels. Preferably, an effective forward velocity is calculated for the left wheels, and a separate effective forward velocity is calculated for the right wheels of the vehicle. A pair of microprocessors may be employed to separately perform calculations for the left and right wheels. Alternatively, a single microprocessor may be provided with a parallel architecture to simultaneously calculate true forward vehicle velocities for the left and right wheels.

Also, although described with reference to an antilock braking system, the velocity sensor of the invention may be advantageously used for other vehicle systems as well. For example, the velocity sensing system may be used in a traction control system for a vehicle wherein, rather than suspending braking of wheels that have lost traction during braking, the system suspends power to wheels which have lost traction during acceleration. In general, the system may be advantageously exploited for any application requiring a precise calculation of the forward velocity of the vehicle, and is particularly useful for applications requiring such calculation to be independent of the wheel rotation rates.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for measuring the speed of a vehicle, the system comprising:
    means for sensing vertical acceleration of a front portion of the vehicle as a function of time;
    means for sensing vertical acceleration of a rear portion of the vehicle as a function of time;
    comparison means for comparing the vertical acceleration of the front portion and the vertical acceleration of the rear portion to determine a time lag between perturbations in the acceleration of the front portion and the rear portion caused by front and rear wheels of the vehicle successively crossing road disturbances; and
    means for calculating a true vehicle speed from the time delay and from the length of the wheel base of the vehicle.

2. The system for measuring the speed of a vehicle of claim 1, used in combination with an antilock braking system, the antilock braking system including:
    means for determining individual angular rotation rates of the front and rear wheels;
    means for determining individual effective forward speeds for the front and rear wheels from the angular rotation rates;
    means for separately comparing the true vehicle speed to the effective forward speeds of the wheels to determine whether a difference exists between the true vehicle speed and the effective forward speed of a wheel, a significant difference being an indication that the wheel has lost traction; and
    means for suspending braking of the wheel until traction resumes, as indicated by the effective forward speeds of the wheels equalling the true forward speed.

3. A system for measuring the speed of a vehicle, the system comprising:
    means for measuring vertical acceleration of a front wheel;
    means for generating a time-varying reference signal corresponding to the vertical acceleration of the front wheel, the reference signal including perturbations caused by the front wheel crossing road disturbances;
    means for measuring vertical acceleration of a rear wheel;
    means for generating a comparison signal corresponding to the vertical acceleration of the rear wheel, the comparison signal including perturbations caused by the rear wheel crossing the same road disturbances, the perturbations of the comparison signal being delayed by a time lag from the perturbations of the reference signal, the time lag being a function of the speed of the vehicle and of the wheel base of the vehicle;
    comparison means for comparing the reference signal and the comparison signal to determine the time lag between corresponding perturbations in the reference signal and the comparison signal; and
    means for calculating a true vehicle speed from the wheel base of the vehicle and the time lag.

4. The system of claim 3, wherein the comparison means further comprises:
    input means for receiving initial values of the comparison and reference signals;
    calculation means for calculating an initial gradient of an integrated square error function between the initial values of the comparison signal and the reference signal;
    calculation means for estimating an initial time lag value from the initial gradient;
    iterative means for successively inputting new values of the comparison signal and the reference signal and for recalculating the gradient of the integrated square error function to combine with a previous estimate of the time lag to produce an updated estimate of the time lag value.

5. The system of claim 3, wherein the means for generating a time-varying reference signal corresponding to the vertical acceleration of the front wheel and the means for generating a comparison signal corresponding to the vertical acceleration of the rear wheel each comprises an accelerometer means.

6. The system of claim 5, wherein each accelerometer means comprises a pair of accelerometers, the pair being mounted to left and right wheels respectively, each accelerometer providing a separate vertical acceleration signal.

7. The system of claim 6, wherein the system determines a time lag between front right and rear right wheels and a time lag between front left and rear left wheels.

8. A method for measuring the speed of a vehicle, the method comprising:
    generating a time-varying reference signal corresponding to vertical acceleration of a front wheel, the reference signal including perturbations caused by the front wheel crossing road disturbances;
    generating a time-varying comparison signal corresponding to vertical acceleration of a rear wheel, the comparison signal including perturbations caused by the rear wheel crossing the same road disturbances, the perturbations of the comparison signal being delayed by a time lag from the perturbations of the reference signal, the time lag being a function of the speed of the vehicle and of the wheel base of the vehicle;
    comparing the reference signal and the comparison signal to determine the time lag between corresponding perturbations in the reference signal and comparison signal; and
    calculating a true vehicle speed from the wheel base of the vehicle and the time lag.

9. The method of claim 8, wherein the step of comparing the reference signal to the comparison signal further comprises the steps of:

receiving initial values of the comparison and reference signals;

calculating an initial gradient of an integrated square error function between the initial values of the comparison signal and the reference signal;

estimating an initial time lag value from the initial gradient; and successively inputting new values of the comparison signal and the reference signal and recalculating the gradient of the integrated square error function to combine with a previous estimate of time lag to produce an updated estimate of the time lag value.

* * * * *

UNITED STATES PATENT AND TRADEMARK OFFICE
CERTIFICATE OF CORRECTION

PATENT NO. : 5,301,130
DATED : April 5, 1994
INVENTOR(S) : Jerry M. Alcone et al It is certified that error appears in the above-identified patent and that said Letters Patent is hereby corrected as shown below:

Cover page, item [75], "Inventors", after "N. Mex.", add -- ; James C. Davis, Berkley, Michigan --.

Signed and Sealed this

Eighteenth Day of June, 1996

*Attest:*

BRUCE LEHMAN

*Attesting Officer*     *Commissioner of Patents and Trademarks*